(12) United States Patent
Haikio et al.

(10) Patent No.: US 12,715,254 B2
(45) Date of Patent: Aug. 25, 2026

(54) TOWING ARRANGEMENT OF A BATTERY-POWERED MINING MACHINE AND A BATTERY-POWERED MINING MACHINE

(71) Applicant: SANDVIK MINING AND CONSTRUCTION OY, Tampere (FI)

(72) Inventors: Sami Haikio, Tampere (FI); Ilkka Hyvonen, Tampere (FI); Esko Laihonen, Tampere (FI)

(73) Assignee: Sandvik Mining and Construction Oy, Tampere (FI)

(*) Notice: Subject to any disclaimer, the term of this patent is extended or adjusted under 35 U.S.C. 154(b) by 265 days.

(21) Appl. No.: 18/717,798

(22) PCT Filed: Aug. 3, 2022

(86) PCT No.: PCT/EP2022/071833
§ 371 (c)(1),
(2) Date: Jun. 7, 2024

(87) PCT Pub. No.: WO2023/104357
PCT Pub. Date: Jun. 15, 2023

(65) Prior Publication Data

US 2025/0042208 A1 Feb. 6, 2025

(30) Foreign Application Priority Data

Dec. 8, 2021 (EP) .................................... 21213057

(51) Int. Cl.
*B60D 1/24* (2006.01)
*E21F 13/00* (2006.01)
*E21F 13/02* (2006.01)

(52) U.S. Cl.
CPC ............ *B60D 1/242* (2013.01); *E21F 13/006* (2013.01); *E21F 13/02* (2013.01)

(58) Field of Classification Search
CPC ......... B60D 1/242; E21F 13/006; E21F 13/02
(Continued)

(56) References Cited

U.S. PATENT DOCUMENTS 4,576,418 A * 3/1986 Holzinger ............. B60T 17/221 303/71
5,112,113 A * 5/1992 Wagner ................... B60T 13/22 188/170

(Continued)

FOREIGN PATENT DOCUMENTS

AU 2020286440 A1 * 11/2021 .............. B60L 53/80
EP 3733432 A1 * 11/2020 ............. B60D 1/143

(Continued)

*Primary Examiner* — James A Shriver, II
(74) *Attorney, Agent, or Firm* — Corinne R. Gorski

(57) ABSTRACT

A towing arrangement for a battery-powered mining machine. The battery machine includes a machine side and a battery unit connected removably to the machine side. The towing arrangement includes a hydraulic cylinder arranged to the machine side to release the brakes of the mining machine when activated, a towing element arranged to move in relation to the battery unit when a towing force is affecting to the towing element, and a mechanical connection located between the towing element and the hydraulic cylinder. The mechanical connection is arranged to activate the hydraulic cylinder for releasing the brakes when a towing force is affected to the towing element. The mechanical connection includes at least one lever.

12 Claims, 4 Drawing Sheets

(58) Field of Classification Search
USPC .......................................................... 280/420
See application file for complete search history.

(56) References Cited

U.S. PATENT DOCUMENTS

| | | | | |
|---|---|---|---|---|
| 5,238,298 | A * | 8/1993 | Wagner | F16D 65/78<br>188/170 |
| 9,969,283 | B2 * | 5/2018 | Deahl | B60L 53/80 |
| 2017/0166022 | A1 * | 6/2017 | Springer | B60D 1/565 |
| 2020/0384969 | A1 * | 12/2020 | Huff | B60T 11/108 |
| 2025/0042208 | A1 * | 2/2025 | Haikio | B60D 1/50 |

FOREIGN PATENT DOCUMENTS

| | | | | |
|---|---|---|---|---|
| EP | 3415398 | B1 * | 8/2021 | B61D 11/00 |
| EP | 3895917 | A1 * | 10/2021 | B60D 1/242 |
| EP | 4194234 | A1 * | 6/2023 | B60D 1/242 |
| WO | WO-2020247620 | A1 * | 12/2020 | B60L 50/66 |

* cited by examiner

TOWING ARRANGEMENT OF A BATTERY-POWERED MINING MACHINE AND A BATTERY-POWERED MINING MACHINE

RELATED APPLICATION DATA

This application is a § 371 National Stage Application of PCT International Application No. PCT/EP2022/071833 filed Aug. 3, 2022 with priority to EP 21213057.9 filed Dec. 8, 2021.

BACKGROUND OF THE ART

The invention relates to a towing arrangement for a battery-powered mining machine, especially a battery-powered load haul dump (LHD) loader, the mining machine comprising a machine side and a battery unit connected removably to the machine side, the arrangement comprising: a hydraulic cylinder arranged to the machine side to release the brakes of the mining machine when activated; a towing element arranged to move in relation to the battery unit when a towing force is affecting to the towing element; a movable element arranged to activate the hydraulic cylinder for releasing the brakes when a towing force is affecting to the towing element.

The invention further relates to a battery-powered mining machine, especially a battery-powered load haul dump (LHD) loader.

For safety reasons, many mining machines use hydraulically released brake systems to provide automatic fail-safe braking on loss of vehicle power or hydraulic fluid pressure. Such brakes prevent a disabled machine from being easily towed. In order to tow the disabled machine easily, it is known to provide towing or retrieval hook of such a mining machine with a releasing arrangement that releases brake when the machine is towed from the hook, thus permitting the towing of the disabled mining machine.

The batteries of the battery-powered LHD loader have been placed in a replaceable battery unit. The towing hook has been placed at the outer end of the battery unit. The towing arrangement is such that when a towing force affects to the towing hook, the towing hook is allowed to move slightly in relation to the battery unit which through a hydraulically powered system releases the breaks of the LHD loader. The brakes are of course situated in the frame of the loader (machine side), whereby the towing force must be led through the battery unit to the machine side.

The hydraulic system in the battery unit is complicated and there are many possibilities to have problems in the system. The hydraulic system is located under the batteries, whereby it is very difficult to fix if something is broken.

SUMMARY

The purpose of the invention is to get rid of the hydraulics in the battery unit by arranging a mechanical connection means between the towing element and the hydraulic cylinder.

According to a first aspect, the present invention provides a towing arrangement for a battery-powered mining machine comprising a machine side and a battery unit connected removably to the machine side. The arrangement comprises a hydraulic cylinder arranged to the machine side to release brakes of the mining machine when activated; a towing element arranged to move in relation to the battery unit when a towing force is affecting to the towing element; and a mechanical connection means between the towing element and the hydraulic cylinder, wherein the mechanical connection means are arranged to activate the hydraulic cylinder for releasing the brakes when a towing force is affected to the towing element. The mechanical connection means comprise at least one lever.

Advantage of the arrangement is that the whole towing arrangement is simpler and easier to use, as the towing arrangement on the battery unit does not have any hydraulic circuit or hydraulic components. With the disclosed arrangement, it is sufficient to have only simple mechanical connection means between the machine side and the towing element and have the required automatic brake releasing system at the same time. The mechanical means and components of the arrangement are more easily replaced and faster and easier to maintenance, while being more durable compared to hydraulic systems. Therefore, the battery unit is more reliable in use.

In one embodiment the mechanical connection means comprise a wire.

In one embodiment the mechanical connection means comprise more than one levers.

In one embodiment the mechanical connection means comprise more than one wire and at least one lever.

In one embodiment the wire is connected to the lever which, when a towing force is affecting to the towing element, is arranged to turn around a fixed joint and push the hydraulic cylinder for releasing the brakes of the battery-powered mining machine.

In one embodiment the arrangement includes a spring, one end of which is connected to the battery unit and the other end to the lever so that when a towing force is not affecting to the towing element, the spring keeps the lever apart from the hydraulic cylinder.

In one embodiment pulleys have been arranged to guide the wire from the towing element to the lever.

In one embodiment the lever arrangement includes a first lever and a second lever hinged to the first lever and a third lever connected to the second lever, wherein the third lever is arranged to activate the hydraulic cylinder.

In one embodiment the third lever moves essentially horizontally.

In one embodiment the third lever is arranged to push the hydraulic cylinder to release the brakes when a towing force is affecting to the towing element.

In one embodiment the towing element is a hook.

In one embodiment the towing element is a loop.

The invention also relates to a battery-powered mining machine using the towing arrangement as defined above.

The mechanical solution is simple and much cheaper than the current hydraulically powered system. It is also less prone to malfunctions during use. There is also no need for any extra connections between the machine side and the battery unit for the purpose of transmitting the towing force to the brakes of the battery-powered mining machine.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Figure 1:
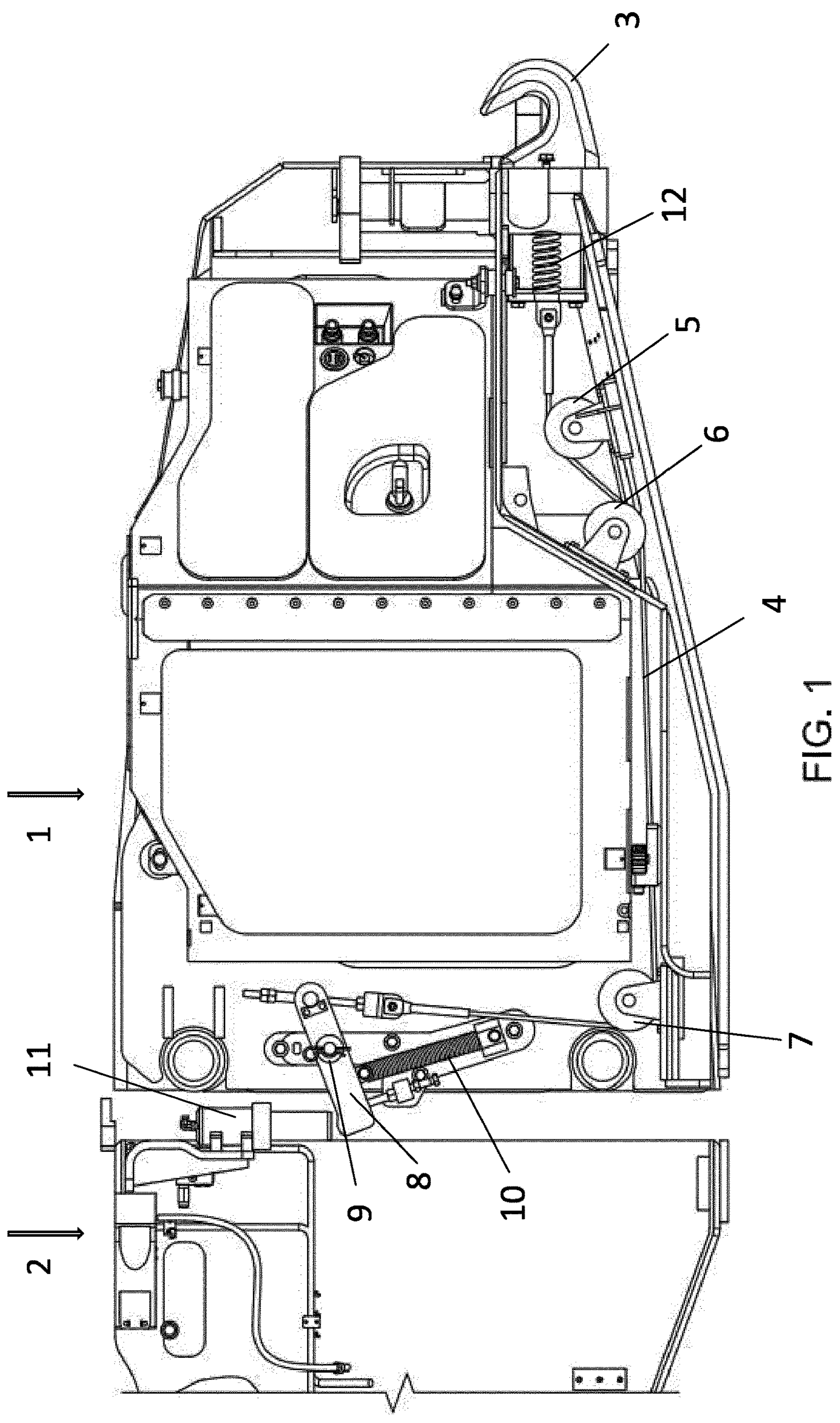
FIG. 1 is a schematic view of a first towing arrangement at rest.

In FIG. 1 a battery unit 1 of a battery-powered mining machine is shown. The battery unit 1 has been fastened removably to the machine side 2 of the battery-powered mining machine. The battery-powered mining machine can be for example a battery-powered load haul dump (LHD) loader or it may be a mine machine or a construction machine e.g. a rock drilling rig, a development drill, a tunnelling drilling machine, a surface drilling machine, a bolting or reinforcing vehicle, a rock removal machine, a long hole drill rig, an explosive charging machine, a loader, a transport vehicle, a loading machine, or hauling machine, setting vehicle of gallery arcs or nets, a concrete spraying machine, a crusher, a measuring vehicle, or a passenger transport vehicle. The battery unit should be easily removable in order to replace an empty battery unit with a fully charged battery unit and, thus, the connection between the machine side ant the battery unit may be only mechanical, at least the connection concerning the towing arrangement and the automatic brake release.

The battery unit 1 includes a towing element, in this case a hook 3. In some other embodiments the towing element may be for example a loop. A towing tool can be connected to the hook for towing the mining machine.

The hook 3 is arranged to move in relation to the battery unit 2 when a towing force is affecting to the hook 3. This towing situation is shown in FIG. 2.

Figure 2:
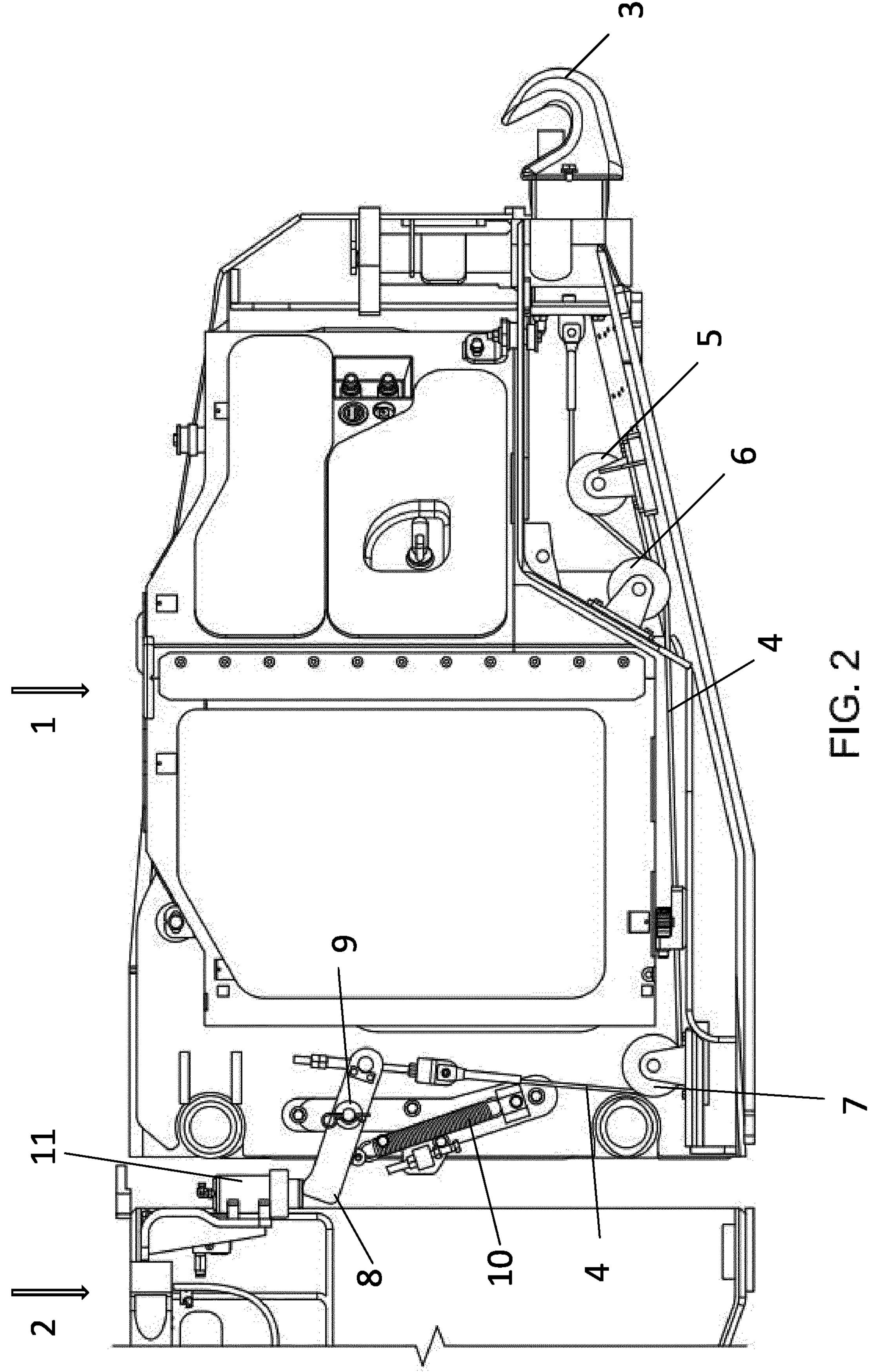
FIG. 2 is a schematic view of the first towing arrangement according to FIG. 1 in towing situation.

The towing arrangement according to the embodiment of the FIGS. 1 and 2 (and 4) includes a wire 4 connected to the hook 3. The wire has been guided via pulleys 5, 6 and 7. At the other end the wire 4 has been connected to a movable element, in this case a lever 8 having a fixed joint 9, around which the lever 8 may turn.

In FIG. 1 the towing arrangement and thus also the lever 8 is in its resting position, in which no towing force affects to the hook 3. A spring 10 has been arranged to keep the lever 8 retracted, i.e. apart from the hydraulic cylinder 11, which is positioned in the machine side 2 of the battery-powered mining machine. This cylinder 11 controls the brakes, and when activated, it releases the brakes.

Further, a spring 12 has been arranged to pull the hook 3 against the battery unit 1 when no towing force affects the to the hook 3.

In FIG. 2 a situation has been shown in which the towing hook 3 is pulled, in other words the mining machine is towed. When the hook 3 is pulled, the wire 4 also moves together with the hook 3 and pulls the lever 8 against the spring force of the spring 10. When the lever 8 is pulled by the wire 4, the other end of the lever 8 (on the other side of the fixed joint 9) pushes the hydraulic cylinder 11 as shown in FIG. 2. When the hydraulic cylinder 11 is pushed, the brakes of the battery-powered mining machine are released, and the towing can be carried out easily.

Figure 3:
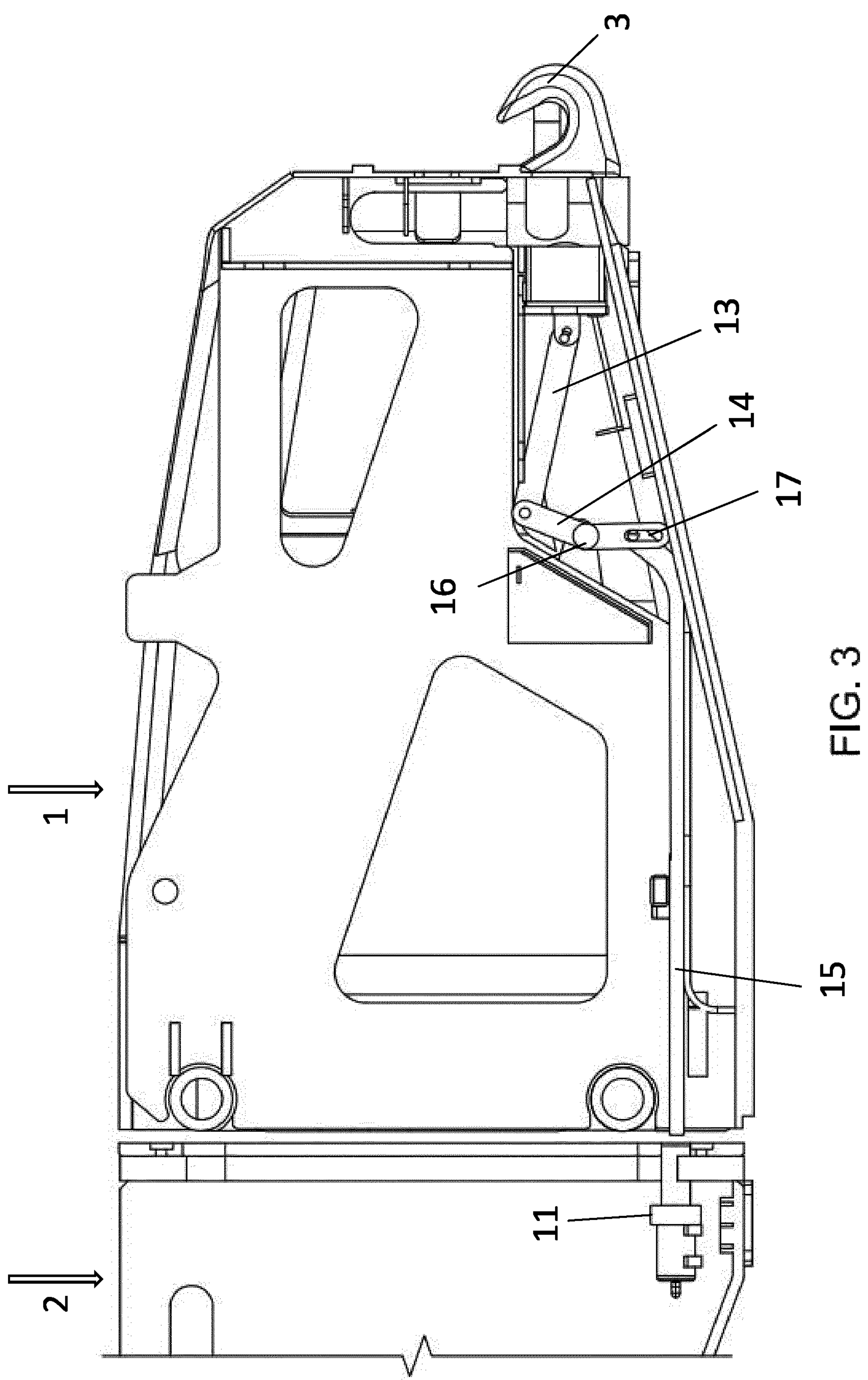
FIG. 3 is a schematic view a second towing arrangement at rest.

In FIG. 3 a second embodiment of the towing arranged has been shown. This time the mechanical connection means between the towing element 3 and the hydraulic cylinder 11 in the machine side 2 is made of levers 13, 14, 15 connected to each other. Between the towing element, for example a hook 3, and the first lever 13 there is again a spring to keep the hook against the battery unit 1 when no force is affecting the hook 3, although the spring is not shown in FIG. 3. The first lever 13 has been hinged at both ends. At the end of the first lever 13 farther from the hook 3 the first lever 13 has been hinged to the second lever 14. The second lever 14 has a fixed joint 16 around which it may turn. At the other end of the second lever 14 there is a longitudinal slot 17 to which one end of the movable element, in this embodiment a third lever 15, has been connected slidably.

The third lever 15 has been arranged to be able to move in an essentially horizontal direction. The third lever 15 is in the same line as the longitudinal direction of the hydraulic cylinder fixed in the machine side 2 of the mining machine. At a rest position, i.e. when no towing force is affecting to the hook 3, the end of the third lever 15, which is near the machine side 2, is close to the hydraulic cylinder 11, but does not push it.

When a towing force is affecting to the towing element, i.e the hook 3 in this case, the hook 3 moves away from the battery unit 1 and pulls the first lever 13. This causes the second lever 14 to turn clockwise around the fixed joint 16. This, in turn, causes the other end of the second lever 14 to push the third lever 15 towards the machine side 2 of the battery-powered mining machine and eventually so far that the end of it pushes the hydraulic cylinder 11 and accomplishes the release of the hydraulically powered brakes. When the brakes have been released, the battery-powered mining machine can be towed easily.

Figure 4:
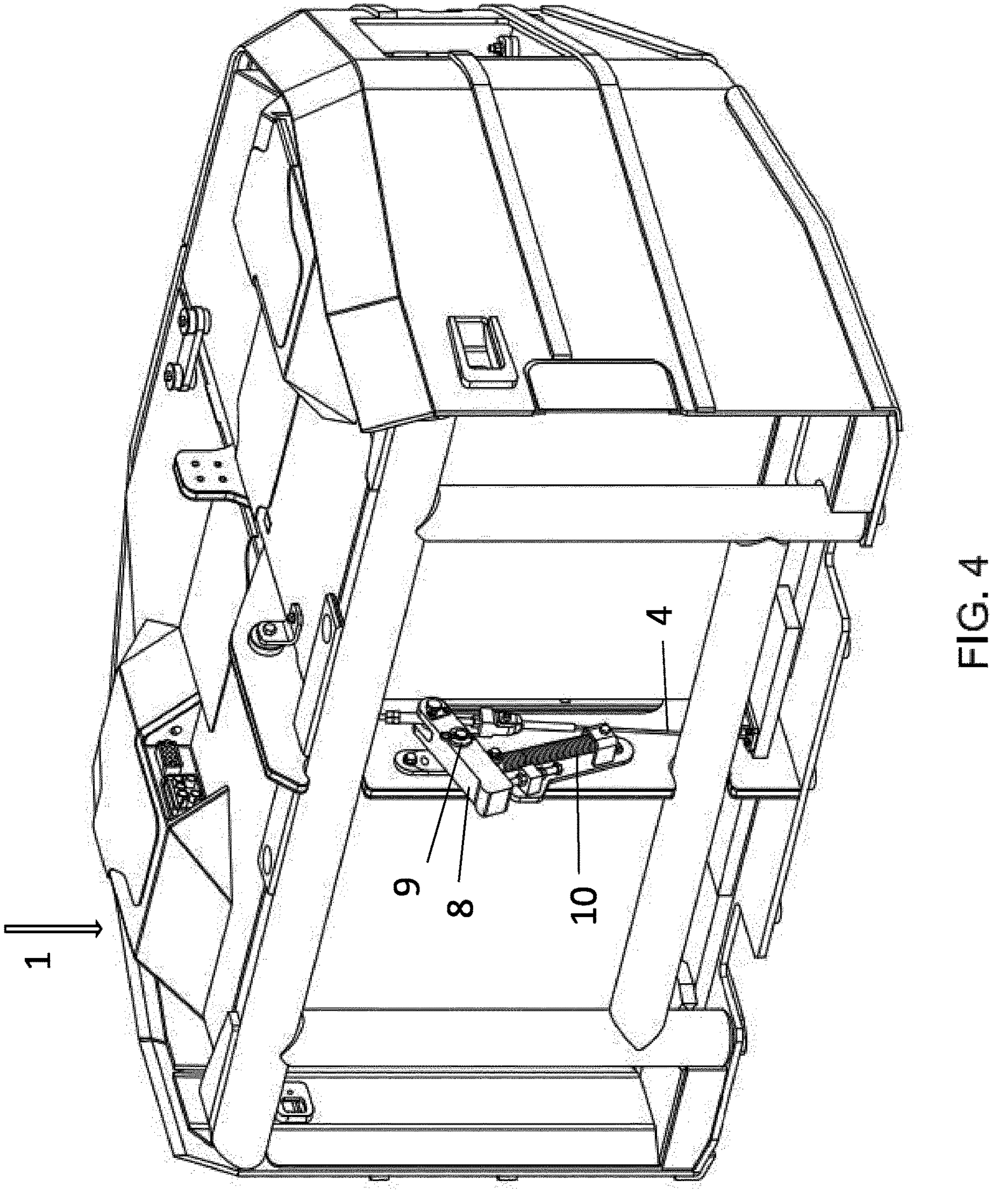
FIG. 4 is a view of the battery unit as seen from the side which shall be fitted against the machine side.

In FIG. 4 the battery unit 1 has been shown. The view is from the machine side 2 of the battery unit, i.e. from the side which is meant to be fastened to the machine side 2. The battery unit 1 has been provided with a towing arrangement according to the first embodiment of the invention, i.e. the embodiment shown in FIGS. 1 and 2. The end of the wire 4 can be seen as well as the moving element, in this case the lever 8. Further, the spring 10 can be seen.

From FIG. 4 it is obvious that the mechanical connection means, which transmits the towing force to the hydraulic cylinder positioned on the machine side 2, is located entirely in the battery unit 1. There is no need for any extra connections between the machine side and the battery unit for the purpose of transmitting the towing force to the brakes of the battery-powered mining machine.

It is obvious to a person skilled in the art that with the advancement of technology, the basic idea of the invention may be implemented in various ways. The invention and its embodiments are thus not limited to the examples described above, instead they may vary within the scope of the claims. For example, the towing arrangement having a wire 4 and a lever 8 as shown in FIGS. 1, 2 and 4 can be designed in many ways. In the Figures only one possible arrangement has been shown. The same concerns the arrangement with more than one levers 13, 14, 15.

Further, the position of the hydraulic cylinder 11 in the machine side 2 can be varied as shown in the embodiments described earlier. For example, it may be positioned near the top or near the bottom of the machine side. However, these are not the only options and they could be positioned anywhere between the top and the bottom.

The invention claimed is:

1. A towing arrangement for a battery-powered mining machine having a machine side and a battery unit connected removably to the machine side, the arrangement comprising:
   - a hydraulic cylinder arranged at the machine side to release brakes of the mining machine when activated;
   - a towing element arranged to move in relation to the battery unit when a towing force is affecting the towing element; and a mechanical connection located between the towing element and the hydraulic cylinder, wherein the mechanical connection is arranged to activate the hydraulic cylinder for releasing the brakes when the towing force is affected to the towing element, wherein the mechanical connection includes at least one lever and at least one wire connected to the at least one lever which, when a towing force is affecting the towing element, is arranged to turn around a fixed joint and push the hydraulic cylinder for releasing the brakes of the battery-powered mining machine.

2. The towing arrangement according to claim 1, wherein the mechanical connection includes more than one lever.

3. The towing arrangement according to claim 1, wherein the mechanical connection includes more than one wire and at least one lever.

4. The towing arrangement according to claim 1, further comprising a spring having opposed ends, one end of which being connected to the battery unit and another end to the lever so, such that when a towing force is not affecting the towing element, the spring keeps the lever apart from the hydraulic cylinder.

5. The towing arrangement according to claim 1, further comprising a plurality of pulleys have been arranged to guide the wire from the towing element to the at least one lever.

6. The towing arrangement according to claim 2, wherein the at least one lever includes a first lever, a second lever hinged to the first lever, and a third lever connected to the second lever, wherein the third lever is arranged to activate the hydraulic cylinder.

7. The towing arrangement according to claim 6, wherein the third lever is able arranged to move substantially horizontally.

8. The towing arrangement according to claim 7, wherein the third lever is arranged to push the hydraulic cylinder to release the brakes when a towing force is affecting the towing element.

9. The towing arrangement according to claim 1, wherein the towing element is a hook.

10. The towing arrangement according to claim 1, wherein the towing element is a loop.

11. A battery-powered mining machine comprising a towing arrangement according to claim 1.

12. The battery-powered mining machine as claimed in claim 11, wherein the battery-powered mining machine is a battery-powered load haul dump loader.

* * * * *